United States Patent
Duchet

(10) Patent No.: US 11,655,840 B2
(45) Date of Patent: May 23, 2023

(54) FASTENER AND ATTACHMENT ASSEMBLY COMPRISING SUCH A FASTENER

(71) Applicant: FAURECIA INTERIEUR INDUSTRIE, Nanterre (FR)

(72) Inventor: Dominique Duchet, Cauvigny (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 17/290,151

(22) PCT Filed: Oct. 31, 2019

(86) PCT No.: PCT/EP2019/079815
§ 371 (c)(1),
(2) Date: Apr. 29, 2021

(87) PCT Pub. No.: WO2020/089389
PCT Pub. Date: May 7, 2020

(65) Prior Publication Data
US 2022/0003257 A1 Jan. 6, 2022

(30) Foreign Application Priority Data

Oct. 31, 2018 (FR) ..................................... 18 60082

(51) Int. Cl.
*F16B 21/07* (2006.01)
*A44B 17/00* (2006.01)
(Continued)

(52) U.S. Cl.
CPC ........ *F16B 21/075* (2013.01); *A44B 17/0041* (2013.01); *B60R 13/0206* (2013.01); *F16B 5/065* (2013.01); *F16B 5/0657* (2013.01)

(58) Field of Classification Search
CPC ...... F16B 21/075; F16B 5/065; F16B 5/0657; A44B 17/0041; B60R 13/0206
See application file for complete search history.

(56) References Cited

U.S. PATENT DOCUMENTS 6,145,870 A * 11/2000 Devane ................. B60R 21/213
280/730.2
6,353,981 B1 * 3/2002 Smith ..................... F16B 2/241
24/295

(Continued)

FOREIGN PATENT DOCUMENTS

| CN | 205183031 U | 4/2016 |
|----|-------------|--------|
| FR | 3028577 A1  | 5/2016 |

(Continued)

OTHER PUBLICATIONS

International Search Report corresponding to International Application No. PCT/EP2019/079815, dated Jan. 31, 2020, 6 pages.

(Continued)

*Primary Examiner* — David M Upchurch
(74) *Attorney, Agent, or Firm* — Reising Ethington P.C.

(57) ABSTRACT

A fastener having two branches extending on either side of a median plane, each branch carrying a tongue, the tongues defining between them a throat between the two branches. When the fastener is reversed with respect to another identical fastener, their respective median planes forming a non-zero angle between them, one branch of the fastener having its distal portion in contact with at least one of the two tongues of the other fastener and its outer face in contact with an inner face of one branch of the other fastener, the distal portion of the other branch of the fastener is substantially in contact with the distal portion of the other branch of the other fastener.

14 Claims, 4 Drawing Sheets

(51) Int. Cl.
  *F16B 5/06* (2006.01)
  *B60R 13/02* (2006.01)

(56) References Cited

U.S. PATENT DOCUMENTS

| | | | | |
|---|---|---|---|---|
| 6,665,914 | B2 * | 12/2003 | Ogawa | F16B 5/06 24/297 |
| 6,718,599 | B2 * | 4/2004 | Dickinson | F16B 21/075 24/295 |
| 6,928,705 | B2 * | 8/2005 | Osterland | F16B 5/065 24/295 |
| 7,051,408 | B2 * | 5/2006 | De Azevedo | F16B 5/0614 24/295 |
| 7,188,392 | B2 * | 3/2007 | Giugliano | F16B 5/065 24/295 |
| 7,287,945 | B2 * | 10/2007 | Lubera | F16B 5/0664 24/295 |
| 7,428,770 | B2 * | 9/2008 | Dickenson | F16B 5/0614 24/295 |
| 7,475,934 | B2 * | 1/2009 | Sato | F16B 17/006 296/146.7 |
| 7,640,634 | B2 * | 1/2010 | Vassiliou | F16B 21/075 24/453 |
| D671,391 | S * | 11/2012 | Komeno | D8/356 |
| 8,458,862 | B2 * | 6/2013 | Reznar | F16B 5/125 24/295 |
| D709,354 | S * | 7/2014 | Komeno | D8/356 |
| D767,372 | S * | 9/2016 | Itou | H02G 3/26 D8/356 |
| 2002/0017009 | A1 * | 2/2002 | Smith | F16B 5/0614 24/295 |
| 2004/0083582 | A1 * | 5/2004 | Dickinson | F16B 5/0614 24/295 |
| 2005/0105987 | A1 * | 5/2005 | Giugliano | F16B 21/075 411/508 |
| 2005/0246870 | A1 * | 11/2005 | Dickenson | F16B 5/0614 24/295 |
| 2006/0117536 | A1 * | 6/2006 | Smith | F16B 5/065 24/293 |
| 2013/0340216 | A1 * | 12/2013 | Smith | F16B 5/065 24/564 |
| 2016/0375840 | A1 * | 12/2016 | Dickinson | F16B 21/075 24/295 |
| 2019/0331148 | A1 | 10/2019 | De Jong | |

FOREIGN PATENT DOCUMENTS

| | | |
|---|---|---|
| JP | H08121441 A | 5/1996 |
| WO | 2018072880 A1 | 4/2018 |

OTHER PUBLICATIONS

Written Opinion corresponding to International Application No. PCT/EP2019/079815, dated Jan. 31, 2020, 5 pages.

French Search Report corresponding to French Application No. FR 1860082, dated Jun. 25, 2019, 2 pages.

* cited by examiner

FASTENER AND ATTACHMENT ASSEMBLY COMPRISING SUCH A FASTENER

TECHNICAL FIELD

The present invention relates to the field of snap-in fastener assemblies.

BACKGROUND

FR3028577A1 discloses a fastener configured to snap into a window of a first attachment part and to receive a fixing tab of a second fastener by snapping in.

In use, such fasteners are bulk packaged in a container, and an operator grasps a fastener to snap the fastener to the first attachment part and then to snap the second attachment part to the fastener.

It has been found that these bulk packaged fasteners become easily intertwined and are difficult to separate quickly, and when an operator, needing to maintain a certain assembly rate, grabs a fastener that is intertwined with one or more fastener(s), the operator tends to discard those fasteners and grab a new fastener.

As a result, fasteners are scrapped even though they are functional, unnecessarily increasing production costs and the scrap to be processed.

SUMMARY

One object of the invention is to provide a fastener that is easy to use.

To this end, the invention relates to a fastener having two branches diverging from each other, giving the fastener a general "V" shape and defining between them a receiving space between them, the two branches extending on either side of a median plane, each branch having a proximal portion connected to the other branch and a free distal portion, each branch having an inner face and an outer face, each branch carrying a tongue projecting from an inner face of this branch, the tongues of the two branches defining between them a throat inside the receiving space, the fastener being configured such that when the fastener is reversed with respect to another identical fastener, with their respective median planes at a non-zero angle to each other, one branch of the fastener is inserted between the branches of said other fastener with its distal portion in contact with at least one of the two tongues of said other fastener, for example, in the vicinity of the throat defined between those tongues of said other fastener, and with its outer face in contact with an inner face of one branch of said other fastener, the distal portion of the other branch of the fastener is substantially in contact with the distal portion of the other branch of said other fastener.

It has been found that the fasteners intermingle particularly by insertion of a distal portion of a branch of one fastener between the tongues of another fastener, particularly when two fasteners are reversed with respect to each other with an inclination between their respective median planes, so that the branch of one of the two fasteners inserts between the two tongues of the other fastener.

The design of the fastener so that in such a case the other branch of the fastener in question comes substantially into contact with the distal portion of a branch of said other fastener makes it possible to generate an additional force opposing the insertion of the branch of the fastener in question between the tongues of said other fastener.

As a result, the risk of the two fasteners becoming entangled is limited, and grasping a fastener in a container receiving the loose fasteners is facilitated.

In particular example embodiments, the fastener may include one or more of the following optional features, taken alone or in any technically possible combination:

- the distal portion of each branch is provided, on the outer face of this branch, with support surfaces facing each other, delimiting a housing for receiving an edge of a window in which the fastener is snapped;
- the distal portion of each branch has an outer rim bearing one of the support surfaces;
- the distal portion of each branch has an inward return delimiting one of the support surfaces;
- each tongue extends in a cantilevered fashion from the distal portion of the branch carrying that tongue and toward the proximal portion of the branch;
- each tongue has a throat portion defining the throat with the corresponding throat portion of the other tongue, the throat portion of at least one tongue being provided to abut on one side of a fixing tab inserted between the two tongues;
- each tongue, the throat portion of which is intended to abut on one side of a fixing tab inserted between the two tongues, is intended to push the fixing tab towards the other tongue, for example perpendicularly to the median plane;
- each tongue has a contact surface facing the connecting portion connecting the branches to each other;
- at least a portion of the contact surface is convex and has a rounded shape;
- the width of the throat, taken perpendicular to the median plane, is between 1.2 mm and 2.0 mm;
- each tongue has a first end and a second end closer to the connecting portion than the first end, the distance between said second end and a distal end of the branch, taken in a plane parallel to the median plane, being between 4.5 mm and 5.5 mm;
- the distance between said connecting portion and a distal end of each branch, taken in a plane parallel to the median plane, is between 7 mm and 11 mm.

The invention further relates to an attachment assembly, comprising a fastener as defined above, a first part comprising a fixing tab configured to insert into the fastener by snapping between the tongues and a second part having a window adapted for snapping the fastener to an edge of the window via its branches.

BRIEF DESCRIPTION OF THE DRAWINGS

The invention and its advantages will be better understood upon reading the following description, given only as a non-limiting example, and made with reference to the appended drawings, in which.

DETAILED DESCRIPTION

Figure 1:
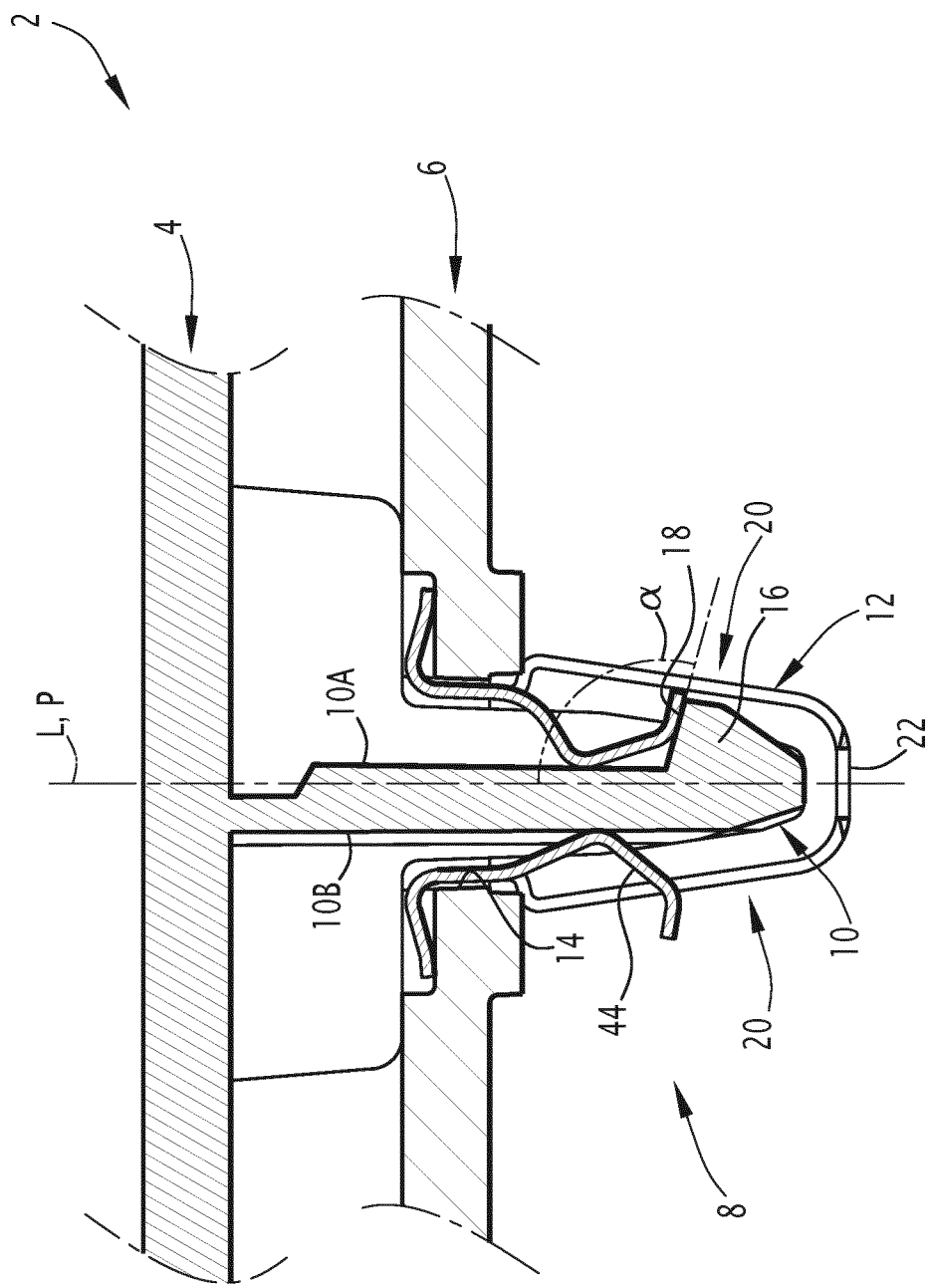
FIG. 1 is a cross-sectional view of an assembly comprising a first part and a second part fixed to each other by means of an attachment device comprising a fastener.

The assembly 2 shown in FIG. 1 includes a first part 4 and a second part 6 attached to each other with a snap-on attachment device 8.

The first part 4 and the second part 6 are for example vehicle parts, in particular vehicle trim parts. The vehicle is preferably a motor vehicle.

In one embodiment, the first part 4 is a decorative insert and the second part 6 is a vehicle trim, for example a dashboard, a door panel, a headliner, etc.

The snap-on attachment device 8 comprises a fixing tab 10 and a fastener 12, the fixing tab 10 being designed to be fastened to the fastener 12 by snap-on.

The fixing tab 10 is attached to the first part 4 and the fastener 12 is configured to be attached to the second part 6.

The fixing tab 10 extends from the first part 4. The fixing tab 10 is, for example, formed in one piece of material with the first part 4, in particular in one piece of plastic material.

In one embodiment, the first part 4 is made by molding (e.g., compression molding or injection molding), and the fixing tab 10 is molded in one piece with the first part 4.

The fastener 12 is separate from the second part 6. The fastener 12 is attached to the second part 6 and snapped into a window 14 formed in the second part 6.

The fixing tab 10 and the fastener 12 are preferably configured for releasable attachment to each other. Thus, the snap-on attachment device 8 allows the first part 4 and the second part 6 to be separated from each other, for example during any maintenance or replacement operations.

The snap-on attachment device 8 is at least partially reusable. The fixing tab 10 and the fastener 12 are configured such that the fixing tab 10 is suitable for removal from the fastener 12 without damaging the fixing tab 10 and the fastener 12.

The fixing tab 10 extends along an extension axis L between a base, adjacent to the first part 4, and a free end, opposite the first part 4. The base is connected to the first part 4.

The fixing tab 10 has two opposite side faces 10A, 10B.

In the vicinity of its free end, the fixing tab 10 has a locking protrusion 16 projecting from one of the two side faces 10A, 10B, the locking protrusion 16 being configured to interact with the fastener 12 in a snap-fit manner to resist separation of the fixing tab 10 and the fastener 12.

The locking protrusion 16 confers a harpoon or hook-like shape to the fixing tab 10, with the locking protrusion 16 forming a locking beak.

The locking protrusion 16 has a locking surface 18, facing the base of the fixing tab 10 and intended to interact with the fastener 12 to ensure the snap on and holding the fixing tab 10 in the fastener 12.

The locking surface 18 extends obliquely with respect to the longitudinal axis L. The term "obliquely" means that the locking surface 18 is neither parallel nor perpendicular to the extension axis L.

The locking surface 18 makes an obtuse angle α with the extension axis L, on the side of the base of the attachment bracket 10. The angle α is strictly greater than 90°. The locking surface 18 makes an angle between 95° and 150° with the extension axis L, for example between 95° and 135°. Here, the locking surface 18 makes an angle of approximately 95° with the extension axis L.

The fixing tab 10 here is devoid of a locking protrusion and locking surface on its second side face 10B.

Figure 2:
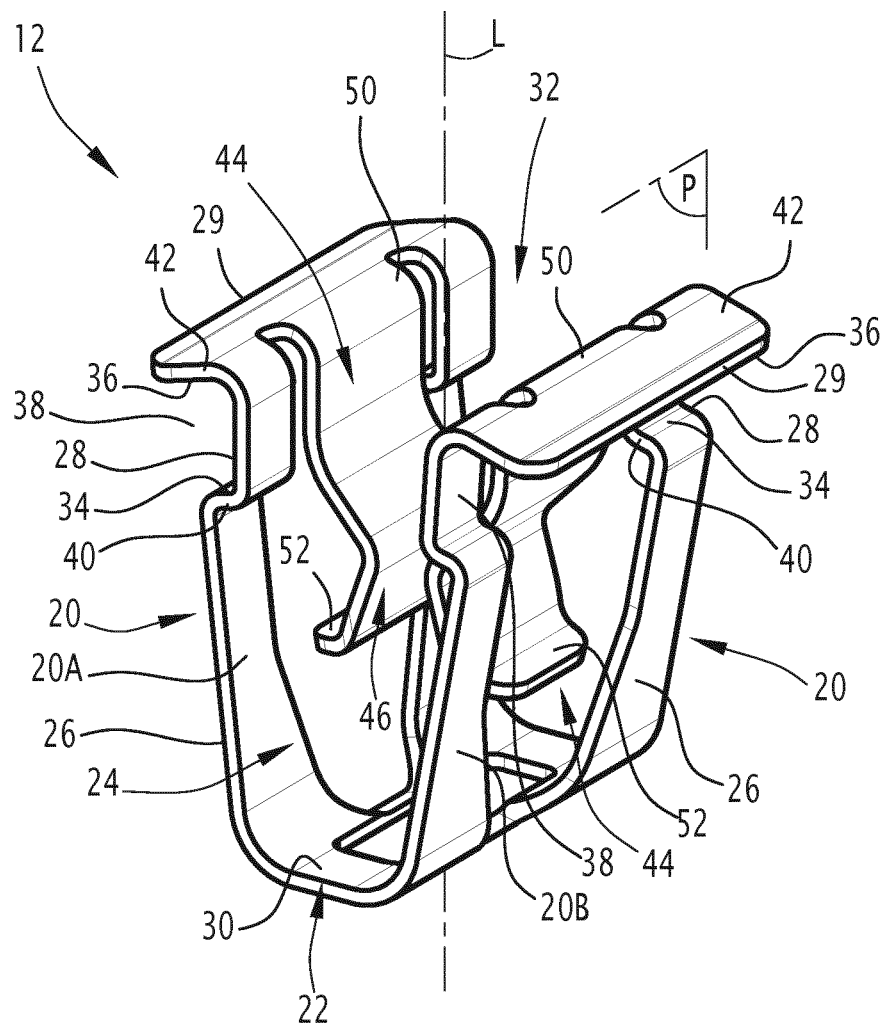
FIG. 2 is a perspective view of the fastener.
Figure 3:
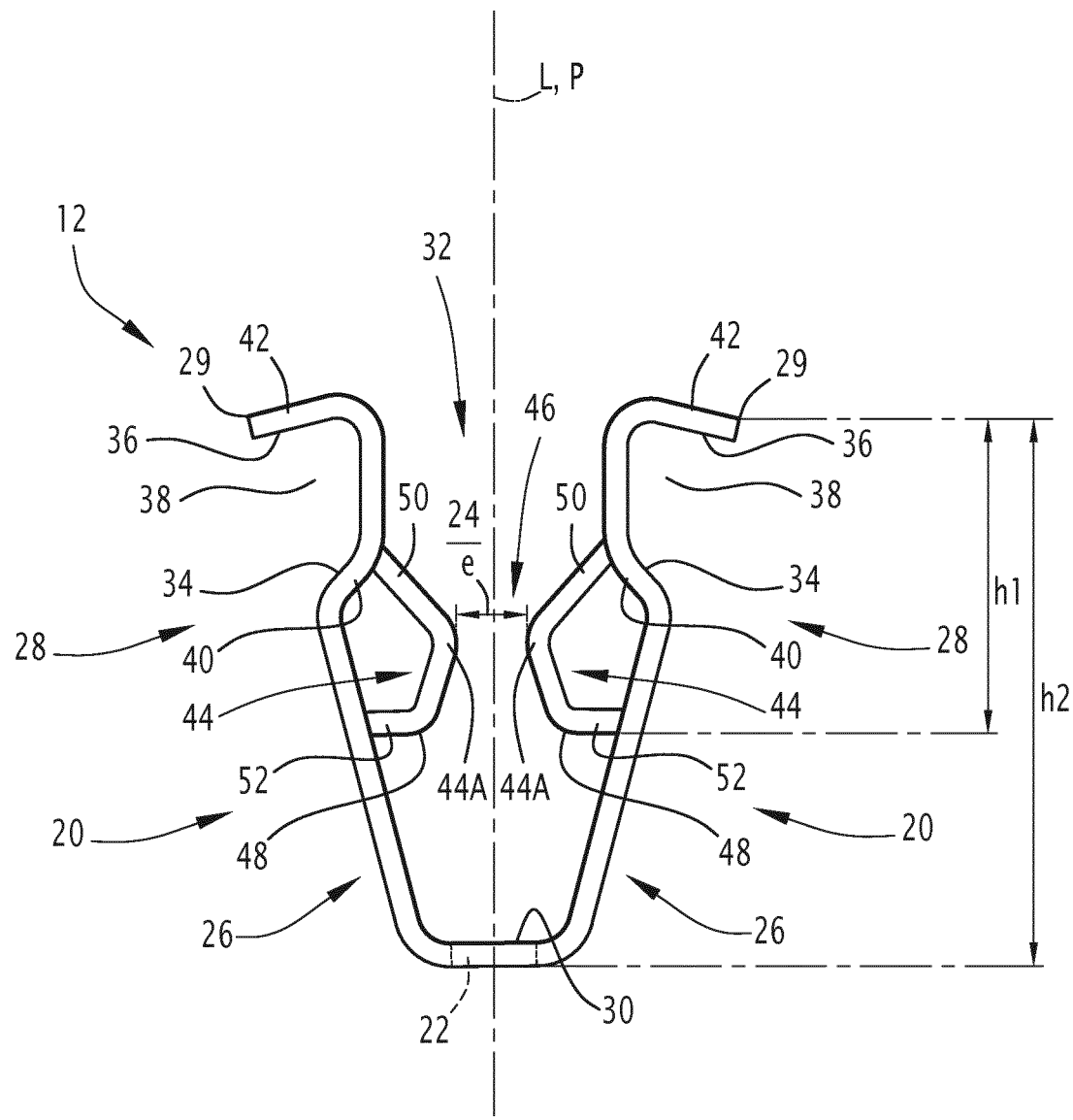
FIG. 3 is a profile view of the fastener.

As seen in FIGS. 1 through 3, the fastener 12 extends along an extension axis L (which coincides with that of the fixing tab 10 when the fixing tab 10 is inserted into the fastener 12 as shown in FIG. 1) and has two branches 20 imparting the fastener 12 a general "V" shape.

The two branches 20 are connected to each other by a connecting portion 22. The connecting portion 22 defines the tip of the general "V" shape.

The two branches 20 extend on either side of a median plane P. The median plane P extends between the two branches 20 and passes through the extension axis L. The fastener 12 is preferably symmetrical with respect to the median plane P passing between the two branches 20. The median plane P is perpendicular to the plane of FIG. 3.

The two branches 20 define between them a receiving space 24. This receiving space 24 is intended to receive the fixing tab 10.

Each branch 20 has a proximal portion 26 adjacent to the connecting portion 22 and a distal portion 28 remote from the connecting portion 22.

The branches 20 extend from the connecting portion 22 in a progressively divergent manner.

The proximal portions 26 of the branches 20 are close from each other and the distal portions 28 of the branches 20 are spaced apart from each other. In other words, the spacing between the proximal portions 26 of the branches 20 is less than the spacing between the distal portions 28 of the branches 20. The spacing between the branches 20 is measured perpendicular to the median plane P of the fastener 12.

Each branch 20 has a distal end 29. The distal end 29 of each branch 20 is free. The distal end 29 of the branch 20 is also the end of the distal portion 28 opposite the proximal portion 26.

In one example embodiment, in the free state of the fastener 12, the branches 20 extend from the connecting portion 22 at a non-zero angle to each other that is, for example, between 10° and 25°, and preferably between 15° and 20°.

The connecting portion 22 defines a bottom 30 of the receiving space 24 and the distal portions 26 of the branches 20 form an entrance 32 to the receiving space 24, for insertion of the fixing tab 10 into the receiving space 2 from the entrance 32 to the bottom 30.

Each branch 20 has an inner face 20A facing the other branch 20 and an outer face 20B facing away from the other branch 20. The inner face 20A of each branch 20 faces inward, i.e., toward the receiving space 24, and the outer face 20B of each branch 20 faces outward, i.e., away from the receiving space 24.

As used herein, the term "inner face" of a branch 20 refers to all surfaces of that branch 20 that face toward the other branch 20, and the "outer face" of a branch 20 refers to all surfaces of that branch 20 that face away from the other branch 20.

The fastener 12 is elastically deformable by bringing the distal portions 28 of the branches 20 together, particularly for insertion of the fastener 12 into the window 14 along the extension axis L.

The distal portions 28 of the branches 20 are configured to snap the fastener 12 onto an edge of the window 14 into which the fastener 12 is intended to be inserted.

Each distal portion 28 is provided with support surfaces adapted to abut against the edge of the window 14 to resist movement of the fastener 12 with respect to the edge of the window 14 along the extension axis L.

More particularly, the distal portion 28 of each branch 20 has, on the outer face 20B of the branch 20, a first support surface 34 oriented so as to oppose extraction of the fastener 12 from the window 14, and a second support surface 36 is oriented so as to prevent the fastener 12 from being pushed further into the window 14.

Each distal portion 28 defines, on the outer face 20B of the branch 20, a housing 38 for receiving the edge of the window 14. The housing 38 is defined between the first support surface 34 and the second support surface 36.

When the fastener 12 is snapped into the window 14, the window edge 14 is received in the housing 38 with the distal portion 28 straddling the window edge 14.

When the fastener 12 is snapped into the window 14, a portion of the contour of the edge delimiting the window 14 is received in the housing 38, between the first support surface 34 and the second support surface 36.

The distance between the first support surface 34 and the second support surface 36, taken along the extension axis L, is substantially equal to the thickness of the edge of the window 14 into which the fastener 12 is intended to be snapped.

The distal portion 28 of each branch 20 has, on the external face 20B of the branch 20, as it moves toward the free end of the branch 20, a return 40 returning toward the inside of the fastener 12 and then a rim 42 returning toward the outside of the fastener 12.

The first support surface 34 is defined on the return 40 and the second support surface 36 is defined on the rim 42.

The fastener 12 is for example formed by bending a metal part. In this case, the return 40 and the rim 42 are formed by bending the branch 20 and separated from each other by one or more folds.

In the free state of the fastener 12, the spacing between the branches 20 at the first support surfaces 36 is greater than the width of the window 14.

Upon insertion of the fastener 12 into the window 14, the fastener 12 deforms elastically so that the branches 20 move toward each other to allow the portions of the branches 20 bearing the first support surfaces 34 (here, the returns 40) to pass through the window 14, and, once the first support surfaces 34 have passed through the edges of the window 14, the fastener 12 elastically relaxes, so that each branch 20 engages the edge of the window 14, via its first support surface 34 and its second support surface 36. The fastener 12 is thus snapped into the window 14.

The distal end 29 of each branch 20 here defines the free end of the rim 42 of that branch 20.

Each branch 20 carries a tongue 44. The tongues 44 are provided for snapping the fixing tab 10 into the fastener 12. When the fixing tab 10 is inserted, the latter is inserted between the tongues 44.

Each tongue 44 protrudes from the inner face 20A of the branch 20 carrying that tongue 44. Each tongue 44 protrudes into the receiving space 24.

The tongues 44 define between them a throat 46 within the receiving space 24. The throat 46 is narrower than an entrance area of the receiving space 24 located between the throat 46 and the entrance 32 and narrower than a bottom area of the receiving space 24 located between the throat 46 and the bottom 30. The width of the receiving space 24 is taken perpendicular to the median plane P.

Each tongue 44 has a throat portion 44A (FIG. 3) defining the throat 46 with the throat portion 44A of the other tongue 44.

The throat 46 is located within the receiving space 24 such that the fixing tab 10 forcefully passes the throat 46 when the fixing tab 10 is inserted into the fastener 12.

Advantageously, each tongue 44 has a convex, rounded contact surface 48 intended to contact the locking surface 18 of the fixing tab 10 in the throat 46 between the two tongues 44.

The contact surface 48 of each tongue 44 is closer to the connecting portion 22 than the throat 46. In other words, the contact surface 48 is located between the throat 46 and the connecting portion 22.

The convex, rounded contact surface 48 provides line contact between the tongue 44 and the locking surface 18.

Each tongue 44 extends along the branch 20 carrying that tongue 44. Each tongue 44 has a first end 50 and a second end 52 spaced apart from each other, the second end 52 being closer to the connecting portion 22 than the first end 50. The contact surface 48 is located between the throat 46 and the second end 52.

Each tongue 44 extends, for example, in a cantilevered fashion from the branch 20 that carries that tongue 44.

In the example shown in FIGS. 2 and 3, each tongue 44 extends in a cantilevered fashion from the distal portion 28 of the branch 20 carrying that tongue 44, from the distal portion 28 of the branch 20 toward the connecting portion 22, with getting closer to the other tongue 44 to the throat 46, and then away from the other tongue 44 from the throat 46. The first end 50 is connected to the distal portion 28 and the second end 52 is free.

In a variant, each tongue 44 extends in a cantilevered fashion from the proximal portion 26 of the branch 20 carrying that tongue 44, from the proximal portion 26 of the branch 20 toward the entrance 32 of the receiving space 26, with getting closer the other tongue 44 to the throat 46, and then away from the other tongue 44 from the throat 46. The first end 50 is free and the second end 52 is connected to the proximal portion 26.

In another variant, each tongue 44 is connected at both ends to the branch 20 carrying that tongue 44. The tongue 44 has the shape of a bridge formed in the branch 20 carrying this tongue 44. The first end 50 is connected to the distal portion 28 and the second end 52 is connected to the proximal portion 26.

Upon insertion of the fixing tab 10 into the fastener 12, the fixing tab 10 is inserted between the two tongues 44 and elastically deforms them outwardly to allow passage of the fixing tab 10, and more particularly the locking protrusion 16.

As the locking protrusion 16 passes the throat 46, at least the tongue 44 on the side of the locking surface 18 (the tongue 44 located on the right in FIG. 1) elastically relaxes and its contact surface 48 comes into contact with the locking surface 18 (FIG. 3). The tongue 44 and the locking surface 18 interact to resist removal of the fixing tab 10 from the fastener 12.

The tongue 44 located on the other side of the fixing tab 10 (the tongue 44 located on the left in FIG. 1) engages the fixing tab 10 with its throat area 44A. This tongue 44 remains elastically deformed and exerts a permanent transverse thrust on the fixing tab 10 in the direction of the other tongue 44. The thrust is substantially directed perpendicular to the median plane P. This thrust tends to keep the locking protrusion 16 engaged with this other tongue 44. In addition, this elastic transverse biasing ensures accurate and reliable positioning of the first part 4 with respect to the second part 6, particularly along a transverse direction perpendicular to the median plane P.

Figure 4:
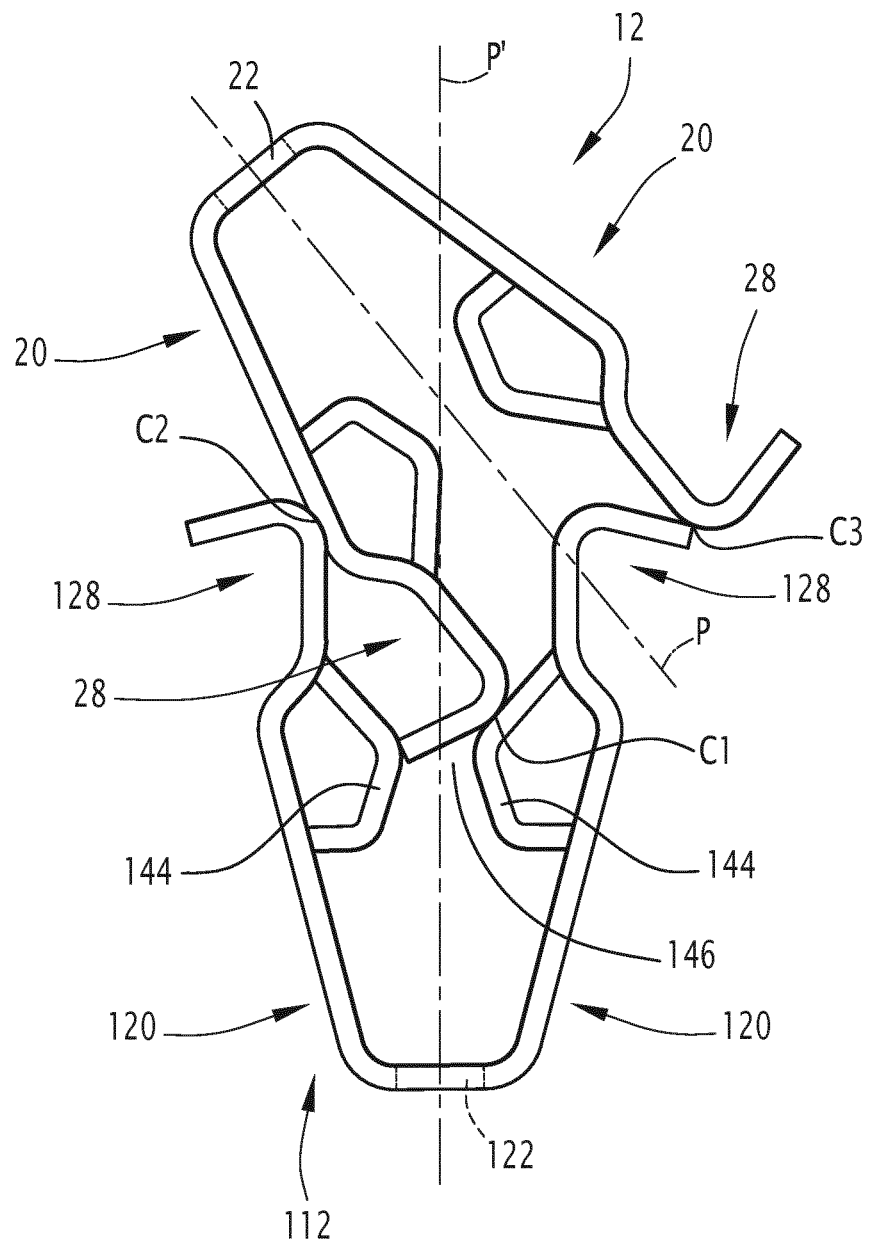
FIG. 4 shows two fasteners identical to that of FIGS. 2 and 3 in profile view, with the fasteners reversed with respect to each other and with a branch of one fastener inserted between the branches of the other fastener.

FIG. 4 illustrates the fastener 12 of FIGS. 1 to 3 and another identical fastener 112 for which the numerical or alphabetical references have been retained by adding the number 100 to the numerical references and an apostrophe ("'") to the alphabetical references, for clarity.

As illustrated in FIG. 4, the fastener 12 is configured so that when the fastener 12 is reversed with respect to another identical fastener 112 and tilted with respect to that other fastener 112 so that their median planes P, P' define a non-zero angle between them, one branch 20 of the fastener 12 being inserted between the branches 120 of said other fastener 12 with its distal portion 28 in contact with at least one of the two tongues 144 of the branches 120 of said other fastener 112 and with its outer face 20B in contact with an inner face 120A of a branch 120 of said other fastener 112, then the distal portion 28 of the other branch 20 of the fastener 12 is substantially in contact with the distal portion 128 of the other branch 120 of said other fastener 112.

Here, "substantially in contact" means that the distance between the distal portion 28 of said other branch 20 of the fastener 12 and the distal portion 128 of said other branch 120 of said other fastener 112 is less than 1.0 mm, and preferably less than 0.6 mm.

In a preferred embodiment, in the above configuration, the distal portion 28 of said other branch 20 of the fastener 12 is in contact with the distal portion 128 of said other branch 120 of said other fastener 112.

Furthermore, still in a preferred embodiment, in the configuration shown above, the distal portion 28 of the branch 20 of the fastener 12 is in contact with the tongue 144 carried by said other branch 120 of the other fastener 112.

Furthermore, again in a preferred embodiment, in the configuration shown above, the contact of the distal portion 28 of the branch 20 of the fastener 12 with the or each tongue 144 of the other fastener 112 is made upstream of the throat 146 defined between the tongues 144 of the other fastener 112, i.e., between the throat 146 and the first end 150 of the or each tongue 144 of the other fastener 112.

Thus, in the configuration of FIG. 4, the fasteners 112 have three points of contact, namely a first point of contact C1 between the distal portion 28 of the branch 20 of the fastener 12 inserted within the other fastener 112 and one or each of the tongues 144 of that other fastener 112, a second point of contact C2 between the outer face 20B of said branch 20 of the fastener 12 and an inner face 120A of a branch of the other fastener 112, and a third point of contact C3 (or of quasi-contact) between the distal portions 28, 128 of the other branches 20, 120 of the fastener 12 and of the other fastener 112.

Preferably, and as illustrated in FIG. 4, the first point of contact C1 is made between the distal portion 28 of the branch 20 of the fastener 12 inserted within the other fastener 112 and the tongue 144 carried by the other branch 120 of said other fastener 112, between the first end 50 of this tongue 144 and the throat 146 defined between the tongues 144 of the other fastener 112.

Two fasteners 12, 112 may be in a configuration as shown in FIG. 4 when the two fasteners 12, 112 are received in bulk in a container with a plurality of other identical fasteners.

In the configuration of the fasteners 12, 112 shown in FIG. 4, there is a risk that the distal portion 28 of the branch 20 of the fastener 12 that is inserted into the other fastener 112 will engage the throat 146 of the other fastener 112, in which case the two fasteners 12, 112 will become entangled.

Separating them may be difficult, and an operator working on an assembly line, thus having to maintain a set assembly rate, and grasping these entangled fasteners 12, 112 may prefer to discard these fasteners 12, 112 rather than take the time necessary to separate them.

Due to the design of the fasteners 12, 112, in a configuration as shown in FIG. 4, the distal portions 28, 128 of said other branches 20, 120 are in contact or come into contact as soon as the distal portion 28 of said branch 20 of the fastener 12 begins to enter into the throat 146 of the other fastener 112.

This creates an additional point of contact C3 and resistive force opposing the movement of the distal end portion 28 of said branch 20 of the fastener 12 between the tongues 144 of the other fastener 112.

The risk of the two fasteners 12, 112 becoming entangled is therefore reduced. As a result, the use of the fasteners 12, 112 by an operator is facilitated.

The design of the fastener 12 to interact in the above manner with another identical fastener 112 is achieved, for example, with appropriate dimensioning of the fastener 12.

In particular, it is achieved with one or more of the following dimensions, individually or in combination:
the width e of the throat 46, taken perpendicular to the median plane P, is between 1.2 mm and 2.0 mm;
the distance h1 between the second end 52 of each tongue 44 and the distal end 29 of the branch 20, taken in a plane parallel to the median plane P, is between 4.5 mm and 5.5 mm;
the distance h2 between the connecting portion 22 and the distal end 29 of each branch 20, taken in a plane parallel to the median plane P, is between 7 mm and 11 mm.

These dimensions determine the points of contact that will occur between the two fasteners 12, 112 when reversed and angled with respect to each other, and the ease with which the two fasteners 12, 112 can interlock.

The fastener 12 is formed from metal or plastic. Preferably, the fastener 12 is formed from a single piece of material.

In one embodiment, the fastener 12 is formed from a single piece of material from a metal sheet that is cut, stamped and/or bent to form the branches 20, the return 40, the rim 42 and/or the tongues 44.

In such an embodiment, each tongue 44 is, for example, cut from the corresponding branch 20 and folded.

In an alternative embodiment, the second snap-on device 12 is formed from a single piece of material by molding, for example from a single piece of plastic material.

The invention claimed is:

1. A fastener for use with a fixing tab having a locking protrusion that locks the fixing tab to the fastener when the fixing tab is fully inserted into the fastener, the fastener comprising two branches diverging from each other and defining between them a receiving space, the two branches extending on either side of a median plane, each branch having a proximal portion connected to the other branch by a connecting portion and a distal portion, each branch having an inner face and an outer face, each branch carrying a tongue protruding into the receiving space, the tongues of the two branches each having a first end, a second end, a throat portion located between the first and second ends, and a contact surface located between the throat portion and the second end, the throat portions of the tongues defining between them a throat within the receiving space that is narrower than the locking protrusion of the fixing tab, wherein, when the fixing tab is fully inserted into the fastener, the throat portion and the contact surface of at least one of the tongues together engage the fixing tab at two separate locations, including one location at a locking surface of the fixing tab's locking protrusion whereby engagement of the contact surface with the locking surface resists removal of the fixing tab from the fastener, and wherein, when the fastener is reversed with respect to another identical fastener and arranged relative to said other identical fastener such that their respective median planes make a non-zero angle between them with one branch of the fastener being located between the branches of said other identical fastener such that the distal portion of said one branch of the fastener is in contact with at least one of the two tongues of said other identical fastener, and with the outer face of said one branch of the fastener in contact with an inner face of one branch of said other identical fastener, the distal portion of the other branch of the fastener engages the distal portion of the other branch of said other identical fastener.

2. The fastener according to claim 1, wherein the distal portion of each branch is provided, on the outer face of the branch, with support surfaces opposite each other, delimiting a housing for receiving an edge of an opening in which the fastener is snapped in.

3. The fastener according to claim 2, wherein the distal portion of each branch has an outer rim bearing one of the support surfaces.

4. The fastener according to claim 2, wherein the distal portion of each branch has an inward return delimiting one of the support surfaces.

5. The fastener according to claim 1, wherein each tongue extends in a cantilevered fashion from the distal portion of the branch carrying said tongue and toward the proximal portion of the branch.

6. The fastener according to claim 1, wherein, when the fixing tab is fully inserted into the fastener, the throat portion of the at least one tongue abuts the fixing tab at a second one of the two separate locations of the fixing tab.

7. The fastener according to claim 1, wherein the contact surface of each tongue faces the connecting portion that connects the branches together.

8. The fastener according to claim 7, wherein at least a portion of each contact surface is convex and has a rounded shape.

9. The fastener according to claim 1, wherein the width of the throat, taken perpendicular to the median plane, is between 1.2 mm and 2.0 mm.

10. The fastener according to claim 1, wherein the second end of each tongue is closer to said connecting portion than the first end, and wherein the distance between said second end and a distal end of the branch, taken in a plane parallel to the median plane, is between 4.5 mm and 5.5 mm.

11. The fastener according to claim 1, wherein the distance between said connecting portion and a distal end of each branch, taken in a plane parallel to the median plane, is between 7 mm and 11 mm.

12. An attachment assembly, comprising a fastener according to claim 1, a first part comprising the fixing tab and a second part having an opening within which the fastener is attached to an edge of the opening via the branches.

13. An attachment assembly, comprising:
a fastener having two branches diverging from each other and defining between them a receiving space, the two branches extending on either side of a median plane, each branch having a proximal portion connected to the other branch by a connecting portion and a distal portion, each branch carrying a tongue extending from a first end at the distal portion to a second end nearer the connecting portion, the tongues of the two branches defining between them a throat within the receiving space,
a first part comprising a fixing tab inserted into the fastener with the fixing tab held between the tongues; and
a second part having an opening within which the fastener is attached;
wherein the fixing tab is engaged by both tongues of the fastener at its throat and at a contact surface of at least one of the tongues that is located between the throat and second end of that tongue.

14. A plurality of fasteners, comprising:
a first fastener; and
a second fastener;
wherein each of the first and second fasteners include two branches diverging from each other giving the fasteners a general "V" shape and defining between them a receiving space, the two branches extending on either side of a median plane, each branch having a proximal portion connected to the other branch by a connecting portion and a free distal portion, each branch having an inner face and an outer face, each branch carrying a tongue projecting from an inner face of that branch, the tongues of the two branches defining between them a throat within the receiving space,
wherein, when the first and second fasteners are reversed with respect to each other and arranged relative to each other such that their respective median planes make a non-zero angle between them with one branch of the first fastener being located between the branches of the second fastener such that the distal portion of said one branch of the first fastener is in contact with at least one of the two tongues of the second fastener, and with the outer face of said one branch of the first fastener in contact with an inner face of one branch of the second fastener, the distal portion of the other branch of the first fastener engages the distal portion of the other branch of the second fastener.

* * * * *